United States Patent [19]
Hanson et al.
[11] 4,181,771
[45] Jan. 1, 1980

[54] THERMALLY RESPONSIVE RECORD MATERIAL

[75] Inventors: Duane E. Hanson; Philip R. Bartels, both of Appleton, Wis.
[73] Assignee: NCR Corporation, Dayton, Ohio

[21] Appl. No.: 848,579
[22] Filed: Nov. 4, 1977
[51] Int. Cl.[2] .................... B32B 5/16
[52] U.S. Cl. .................... 428/327; 427/150; 427/151; 427/152; 428/332; 428/340; 428/488; 428/511; 428/530; 428/533; 428/535
[58] Field of Search .................... 427/146, 150, 151, 153; 428/323, 914, 488, 511, 533, 535, 530, 327, 332, 340

[56] References Cited

U.S. PATENT DOCUMENTS

| | | | |
|---|---|---|---|
| 3,988,522 | 10/1976 | Bernstein | 428/323 |
| 4,011,352 | 3/1977 | Janssens et al. | 427/150 |
| 4,012,292 | 3/1977 | Fujiwara et al. | 427/150 |
| 4,020,232 | 4/1977 | Kohmura et al. | 427/150 |
| 4,025,399 | 5/1977 | Matsumoto et al. | 427/150 |
| 4,032,690 | 6/1977 | Kohmura et al. | 427/151 |
| 4,054,718 | 10/1977 | Garner et al. | 427/150 |

*Primary Examiner*—Michael F. Esposito
*Assistant Examiner*—Janyce A. Bell
*Attorney, Agent, or Firm*—Birch, Stewart, Kolasch and Birch

[57] ABSTRACT

A thermally sensitive record material having a very low abrasive surface comprising a substrate coated with a colorless chromogenic material and a phenolic co-reactant in a binder and including a cross-linked urea-formaldehyde resin pigment as a component thereof. The use of the urea-formaldehyde (UF) resin pigment provides a thermal record material with superior bleed resistance, extremely low abrasivity, thereby reducing wear on imaging tools such as print heads, and improved release properties. The UF pigment also improves the image to background contrast and the efficiency of the action of the co-reactants in the record material.

34 Claims, No Drawings

THERMALLY RESPONSIVE RECORD MATERIAL

This invention relates to thermally responsive record material. More particularly, it relates to thermally responsive record material having a low abrasion characteristic.

Heat-sensitive record material is well known in the art and is described in many patents, for example, U.S. Pat. No. 3,445,261 of Talvalkar, U.S. Pat. No. 3,539,375 of Baum and U.S. Pat. No. 3,674,535 of Blose et al. In this system, a basic chromogeneous compound and an acidic compound are contained in a coating on a paper substrate which, when heated to a suitable temperature, melts or softens to permit said compounds to react, thereby producing a colored mark. Typically, a heated instrument such as a hot stylus is used to produce the colored mark on the sheet of coated paper.

However, the thermal record materials known in the art have several disadvantages:

(1) A loss of image sharpness or definition occurs (i.e., "bleed") when an attempt is made to gain more intense color development by increasing coating weight, increasing quantities of color reactants and co-reactants in the formulation, adding wax modifiers or increasing the developing temperature of the imaging means (e.g., the print head, stylus, etc.).

(2) Abrasion or wearing of the imaging tool occurs when the imaging tool seldom or never lifts off the record material during the imaging process as with chart recording.

(3) Techniques employed to gain improved intensity result in increased sticking and/or picking of the coating on the imaging tool, thereby increasing its wear.

These disadvantages lead to undesirable results such as poor legibility of images and fouling of the imaging means which greatly reduces the useful life of the imaging tool, e.g., a printing head, leading to even more image illegibility.

Accordingly, one of the objects of the present invention is to provide a thermally responsive record material having a very low abrasion characteristic.

Another object of the invention is to provide a thermally sensitive record material having a strong resistance to bleeding and an excellent image intensity, while retaining an abrasion-free surface.

These and other objects and advantages of the invention will become apparent to those skilled in the art from a consideration of the following specification and claims.

In accordance with the present invention, it has been found that a coating comprising a urea-formaldehyde resin pigment in combination with a color former of the phthalide or fluoran type, a coreactant of the phenolic type, binders and conventional additives on a suitable substrate provides a thermally sensitive record material that exhibits improved image intensity with superior bleed resistance and a very low abrasivity characteristic.

The urea-formaldehyde resin pigments employed in the invention are cross-linked condensation products of urea and formaldehyde sold under the trade name Cab-O-Lite by the Cabot Corporation. They are unique in that, unlike most pigments, they are comprised of small primary particles joined in agglomerates of controlled size. The primary particles have an average diameter of about 0.15 micron and the agglomerates range from 7 to 9 microns mean diameter up to about 10 microns.

The significance of the agglomerate nature of said urea-formaldehyde resin pigments, as contrasted to the usual mineral pigments or fillers such as $TiO_2$, clay, $CaCO_3$ or talc which are single crystalline particles of high density which are either relatively hard and spherical or softer platelet structures with sharp edges and therefore generally abrasive, is derived from the substantial void volume of controlled size within the agglomerates which provides high bulk at low density and a large number of air-particle interfaces for increased light scattering. This unique structure and combination of properties have been found to be very advantageous in the enhancement of the desired properties in thermal paper of background whiteness and intense color development while yielding a coating with virtually no abrasive character.

A suitable urea-formaldehyde resin pigment employed in accordance with the present invention is the urea-formaldehyde pigment described in U.S. Pat. No. 3,988,522 of Berstein, said pigment consisting essentially of a substantially water-insoluble, cross-linked urea-formaldehyde resin in highly dispersed particulate form. The BET specific surface area of these particulate urea-formaldehyde pigments ranges from about 40 to about 75 square meters per gram, and the average agglomerate size of the pigments as commercially produced is about 2 to about 10 microns (although not limited thereto). A suitable agglomerate size for use in the present invention is about 3 to 9 microns.

The molar ratio of urea to formaldehyde chemically combined in the structure of the pigments employed in the invention ranges from about 1:1.3 to about 1:1.8. Additionally, the internal structure of these pigments is highly cross-linked, rendering them essentially infusible and insoluble in water and thus quite different from ordinary fusible and/or water-soluble urea-formaldehyde condensation polymers.

These urea-formaldehyde pigments are prepared by reacting formaldehyde with urea in a molar proportion of urea to formaldehyde ranging from about 1:1.3 to about 1:1.8 in an aqueous solution, the amount of water in the reaction solution being at least equal to the total weight of the organic reactants therein. Suitable reaction temperatures are generally in the range of from about room temperature up to about 100° C., the most practical range of temperature being from about 40° C. up to about 85° C. Stirring or other agitation of the aqueous reaction medium is preferred, especially during the time when the insoluble, cross-linked pigments are being formed.

Relatively strong inorganic and/or organic acids having an ionization constant greater than $10^{-4}$, such as sulfuric acid, phosphoric acid, sulfamic acid or chloroacetic acid, are employed as a suitable cross-linking catalyst. The most preferred catalysts utilized for preparing the particular urea-formaldehyde resin pigments used in this invention are sulfamic acid and/or water-soluble ammonium acid sulfate salts, such as ammonium bisulfate.

The resulting insoluble pigment is recovered from the aqueous liquid by conventional techniques such as filtration, centrifugation and drying. As noted above, the obtained pigment is more or less agglomerated into various aggregates and gel-like granules. If necessary, the pigment may be comminuted by milling to obtain a suitable particle size.

The color reactants employed in the thermally responsive record material of the invention are generally Crystal Violet Lactone, designated herein as CVL, and bisphenol A. Other suitable color formers include 2'-anilino-3'-methyl-6'-diethylamino fluoran (N-102-T), Malachite Green lactone; 3,3-bis(paradimethylaminophenyl) -6-aminophthalide; 3,3-bis(paradimethylaminophenyl)-6-(paratoluene-sulfonamide)phthalide; 3-diethylamino-7-dibenzylamino-fluoran; 3-diethylamino-7-(N-methylanilino)-fluoran; 3-diethylamino-7-(N-methyl-p-toluidino)-fluoran; 3-dimethylamino-6-methoxyfluoran; 3-diethylamino-6-methyl-7-chlorofluoran; 3-dibutylamino-6-methyl-7-chlorofluoran; 3-diethylamino-7-phenylfluoran; and 3-morpholino-5,6-benzofluoran.

Suitable phenolic compounds which are capable of liquefying and/or vaporizing at normal thermographic temperatures to react with the substantially colorless chromogenic compounds to form a colored mark include various diphenols or triphenols, for example, as disclosed in U.S .Pat. No. 3,539,375 of Baum. Examples thereof are 4,4'-isopropylidene diphenol (bisphenol A), 4-tertiarybutyl phenol, α-naphthol, 4-tertiary-octylcatechol, 4,4'-isopropylidene-bis(2,6-dichlorophenol), etc.

The substantially colorless chromogenic material and phenolic compounds are distributed in a suitable binder, for example a polyvinyl alcohol film, which acts to hold the chemicals together on the support means. The preferred polyvinyl alcohol is a medium-viscosity grade of 99 percent hydrolysis, such as the Elvanols from Dupont and the Vinols from Air Products. Other nonreacting water-soluble binders can be utilized, for example, starch, hydroxyethylcellulose, methylcellulose, hydroxypropyl methylcellulose or mixtures of these binders and soluble or non-soluble polymeric binders.

Lubricants and release agents such as waxes are also employed in the formulations of the invention. Generally, the lubricants increase light fade resistance as well as lubricate. Specific examples are zinc stearates as well as other water-insolublestearates of calcium, iron, cobalt, nickel, aluminum, manganese, lead, lithium and the like. The release agents which can function as release agents per se and/or as sensitivity modifiers are of high enough melting point so that they will not melt and react with the coating under normal storage conditions. A wide variety of one or a mixture of waxes can be employed in this invention. Waxes which can be utilized in the present invention include fatty amides and diamides, e.g., stearamide, behenamide, oleamide, high molecular weight ketones, laurone, stearone, high molecular weight alcohols such as behenyl alcohol and arachidyl alcohol, paraffins, microcrystalline waxes and the like.

Small amounts of conventional materials such as wetting agents and defoamers can also be employed in the record material of this invention.

Under processing conditions, separate dispersions of the colorless chromogenic material and bisphenol are made to reduce excessive discoloration of the wet color. Generally, the dye dispersion comprises one or more color reactants, e.g., CVL and/or N-102-T and polyvinyl alcohol with small amounts of wetting agent and defoamer. The coreactant dispersion comprises a phenol, e.g., bisphenol, a binder, e.g., polyvinyl alcohol, nontacky wax and a lubricant with small amounts of a wetting agent and defoamer.

Each dispersion can be comprised of 15 to 40 percent solids in water, preferably 20 l to 30 percent. For example, for every 100 grams of dispersion, there is 20 grams of dry solids and 80 grams of water. Generally, a period of time ranging from 8 to 24 hours is allowed to pass before the two dispersions are contacted with each other in order to reduce excessive discoloration of the wet color.

The urea-formaldehyde resin agglomerates are also prepared in a separate dispersion, suitably containing about 5 to 50%, preferably about 10 to 30%, dry weight of the urea-formaldehyde resin pigment.

The amounts of material in the final formulation generally are as follows. The color reactant ranges from about 1 to 10 percent, preferably 3 to 7 percent, by weight, the phenolic compound ranges from 5 to 50 percent, preferably 15 to 40 percent, by weight and the binder ranges from about 10 to 60 percent, preferably 15 to 45 percent, by weight. The final formulation can comprise any amount greater than 0 up to about 50 weight percent, preferably up to about 30 weight percent, of urea-formaldehyde resin pigment. An amount greater than 0 and up to about 15 weight percent, preferably 1 to 10 weight percent, of a lubricant can be used in the final formulation, and the wax can vary from greater than 0 and up to about 40 weight percent, preferably 1 to 25 weight percent. Small amounts of a wetting agent and a defoamer also are present, generally less than 1 weight percent.

The substrate sheet is preferably paper. However, the substrate may comprise sheets of film-like polymeric material, woven material or laminated material, suitably coated or impregnated with the mark-forming components.

EXAMPLES OF THE INVENTION

The following Examples are given merely as illustrative of the invention and are not to be considered as limiting. Unless otherwise noted, the percentages therein and throughout the application are by weight.

EXAMPLE 1

A dye dispersion is prepared having the following formulation:

| | Dry Wt. % |
|---|---|
| CVL dye (3,3-bis[4-dimethylaminophenyl]-6-dimethylaminophenyl phthalide) | 37.25 |
| N-102-T dye (2'-anilino-3'-methyl-6'-diethylaminofluoran) | 37.25 |
| Vinol 325 (polyvinyl alcohol) | 25.00 |
| Nopco NDW (defoamer) (sulphonated castor oil) | 0.10 |
| Surfynol 104 (surfactant) (di-tertiary acetylenic glycol produced by Air Products Chemical Co.) | 0.40 |
| TOTAL | 100.00 |

A 10% solution of the Vinol 325 is added to the Szegvari attritor (a particle size reducing apparatus made by Union Process Co.) together with the other components listed above, and the mixture is ground until the particle size of the color formers reaches the range of 1–6 microns. Water is used to adjust the grind solids to the range of 20–30 wt. percent.

A bisphenol dispersion is prepared having the formulation:

| | Dry Wt. % |
|---|---|
| Bisphenol A (4,4'-isopropylidene diphenol) | 48.00 |
| Acrawax C* | 42.00 |
| Vinol 325 | 9.50 |
| Nopco NDW | 0.10 |
| Surfynol 104 | 0.40 |
| TOTAL | 100.00 |

*Acrawax C, a fatty diamide wax which is a reaction product of hyrogenated castor oil and ethanolamine, is insoluble in boiling water, and has a melting point of 140°-143° C., a flash point of 285° C. (open cup) and a specific gravity of 0.97 at 25° C. (Available from Glyco Chemicals, Inc., New York).

The attritor is charged with a 10% solution of the Vinol 325 and the other materials listed above. Water is added to adjust the grind solids to 20-35 wt. percent, and the materials are ground until the particle size of the bisphenol reaches 2-8 microns.

A bisphenol blend is then prepared according to the following formulation:

| | Dry Wt. % |
|---|---|
| Bisphenol dispersion (prepared as above) | 44.15 |
| Penford Gum 260 (modified corn starch) | 26.50 |
| Cab-O-Lite (urea-formaldehyde resin pigment) | 29.35 |
| TOTAL | 100.00 |

A Kady Mill is charged with the bisphenol dispersion, the Penford Gum 260 solution in an amount of 12 wt. percent and dry Cab-O-Lite. The charge is mixed until all the materials are thoroughly dispersed. Water is used to adjust the solids content to about 20 wt. percent.

The final coating blend is then prepared by mixing the following components:

| | Dry Wt. % |
|---|---|
| Bisphenol blend (prepared as above) | 94.15 |
| Dye dispersion (prepared as above) | 5.35 |
| Arctic Paper White (optical brightener, a reaction product of diamino stilbene sulphonic acid and cyanuric chloride) | 0.50 |
| TOTAL | 100.00 |

The resulting coating blend has the following formulation:

| | Dry Wt. % |
|---|---|
| CVL dye | 2.00 |
| N-102-T dye | 2.00 |
| Vinol 325 | 4.75 |
| Penford Gum 260 | 25.00 |
| Acrawax C | 17.75 |
| Cab-O-Lite | 27.50 |
| Bisphenol A | 20.00 |
| Nopco NDW | 0.10 |
| Surfynol 104 | 0.40 |
| Arctic Paper White | 0.50 |
| TOTAL | 100.00 |

A thermal sheet (Thermal Sheet A) is prepared from this formulation by coating on a 50 g/m² substrate paper at a dry coating weight of about 4.5 g/m².

In the same manner as described above, a comparison thermal sheet (Thermal Sheet B) containing kaolin clay instead of the urea-formaldehyde resin pigment is prepared with the following coating formulation:

| | Dry Wt. % |
|---|---|
| CVL dye | 3.00 |
| N-102-T dye | 3.00 |
| Vinol 325 | 29.20 |
| Acrawax C | 2.0 |
| Bisphenol A | 30.00 |
| Nopco NDW | 0.10 |
| Surfynol 104 | 0.40 |
| Arctic Paper White | 0.30 |
| Kaolin clay | 30.00 |
| Zinc stearate | 2.00 |
| TOTAL | 100.00 |

The resulting thermal sheets are then subjected to the following tests:

Color Development

The intensity (reflectance) of the area imaged at 150° C. is measured on a Bausch & Lomb opacimeter. The background reflectance is a measurement of the unimaged area.

Abrasivity

A control test for abrasivity is unnecessary since the low abrasion characteristic is an intrinsic property of the coating formulations of the invention. However, relative abrasivities of various coating formulations are determined by utilizing a Sargent Model SLR Chart Recorder connected to a Hewlett Packard Model 203A Variable Phase Function Generator.

The recorder pen stylus assembly is replaced with a specially made assembly designed to hold a small section of standard 3B drafting lead of 2 mm diameter perpendicular to the chart surface. An uncalendered test sample of at least 20×30 cm grain long is taped, coated side up, to the chart. Using a square wave function of 0.6 Hz frequency and 16 cm amplitude with a 2.0 Newton force exerted on the drawing lead, the lead is allowed to oscillate in contact with the paper for exactly 8 minutes and 41 seconds at a chart speed of 2.54 cm/minute. The weight loss to the nearest 0.1 mg. of the drafting lead over the 100 m. total length of trace is taken as the abrasivity value of the coating.

Sticking

The degree of print head stick of a thermal coating composition is determined by the direct measurement of the amount of torque required to release the paper from a print head within 0.5 seconds after imaging.

The static stick test is performed on a modified line printer in which the paper is forced against a thermal print head by a rubber backing roll or platen. The print head is comprised of a horizontal line of 400 electrically heated dots which are simultaneously activated by pushing a button. The backing roll which also serves to advance the paper is fitted on one end with a hex socket that rotates the backing roll when a hex key is inserted and turned. The hex key is clamped in the chuck of a Model 940-2 Torque Watch Gauge manufactured by Waters Manufacturing Inc. which yields a direct reading in inch-ounces of torque. This reading is multiplied by $7.06\times10^4$ to convert to dyne-cm of torque. The proper test configuration is one in which the longitudinal axes of the Torque Watch Gauge, hex key, hex socket and backing roll lie in a straight horizontal line.

The usual sample size of 21 cm ×28 cm but must be a minimum of 21 cm ×15 cm. The results are reported as an average of ten separate readings, each taken within 0.5 seconds of dot activation.

Bleed Resistance

Bleed resistance is determined by the indirect measurement of the image halo in millimeters on an area of the thermal coating imaged at approximately 2 Newtonsm$^2$ pressure for 5 seconds on a rectangular aluminum plate measuring 25.4 mm ×101.6 mm and heated to 150° C. ±5° C.

The imaged area is then measured to the nearest millimeter in either dimension. Half of the distance between the image dimension and the corresponding plate dimension is recorded as the image halo.

These tests give the following results on the above-identified thermal sheets:

| Property | Thermal Sheet A | Thermal Sheet B |
|---|---|---|
| Coat Weight: | | |
| grams dye/m$^2$ | 0.18 | 0.27 |
| grams bisphenol/m$^2$ | 0.90 | 1.35 |
| Color development: | | |
| intensity (reflectance) | 6.2 | 8.5 |
| background reflectance | 85.7 | 82.5 |
| Abrasivity: | | |
| mg loss (3B drawing lead/100 m trace | 0.6 | 51.0 |
| Sticking: | | |
| release torque (dyne-cm) | $2.096 \times 10^6$ | $3.780 \times 10^6$ |
| Bleed resistance: | | |
| image halo (mm) | 0.38 | 1.01 |

It can be seen from these results that the thermal sheet of the invention has significant physical and functional advantages over a thermal sheet which contains no urea-formaldehyde resin pigment. The image to background contrast is improved by the good light scattering qualities of the urea-formaldehyde resin pigment and, in addition, said pigment appears to increase the efficiency of the co-reactants themselves so as to provide an excellent image density upon thermal imaging. Moreover, certain manufacturing advantages are also found to be associated therewith, e.g., the thermal paper of the invention requires less than 70% of the drying and less than 60% of the air knife pressure used for the comparison thermal paper (Thermal Sheet B) described above at equal solids and machine speeds. Such advantages are due to the much lower viscosity of the coating formulation in accordance with the invention, which permits a higher solids content and thereby greatly increases the coating preparation capacity.

EXAMPLE 2

A black thermal image record material is prepared having the following dry coating formulation:

| | Dry Wt. % |
|---|---|
| CVL dye | 0.90 |
| N-102-T dye | 3.60 |
| Bisphenol A | 22.50 |
| Acrawax C | 10.00 |
| Zinc Stearate | 6.75 |
| Cab-O-Lite (urea-formaldehyde resin pigment) | 10.00 |

-continued

| | Dry Wt. % |
|---|---|
| Methocel A15 (methyl cellulose) | 9.75 |
| Essex Gum 1390 (etherified potato starch-Penick & Ford) | 15.00 |
| Vinol 325 | 15.00 |
| Glyoxal 40% solution of glyoxal in water) | 5.00 |
| Arctic Paper White | 0.50 |
| Surfynol 104 H (25% ethylene glycol, 75% Surfynol 104) | 0.65 |
| Nopco NDW | 0.10 |
| Sodium carbonate | 0.25 |
| TOTAL | 100.00 |

The above formulation is prepared in independent procedures in the following manner.

| Black Image Dye Grind Formulation | Dry Wt. % |
|---|---|
| Vinol 325 (10% solution) | 30.00 |
| Nopco NDW | 0.10 |
| Surynol 104 H | 0.40 |
| CVL dye | 13.90 |
| N-102-T dye | 55.60 |
| TOTAL | 100.00 |

This formulation is ground in the attritor at 25% weight solids until the desired particle size is achieved. The dispersion is discharged with rinse water to a storage container yielding a final grind solids of 20%.

| Bisphenol Grind Formulation | Dry Wt. % |
|---|---|
| Methocel A15 (5% solution) | 15.00 |
| Nopco NDW | 0.20 |
| Surfynol 104 H | 0.80 |
| Zinc stearate | 14.35 |
| Acrawax C | 21.27 |
| Bishpenol A | 47.85 |
| Sodium carbonate | 0.53 |
| TOTAL | 100.00 |

These ingredients are ground in the attritor at 20% weight solids until the desired particle size is achieved. The dispersion is discharged with rinse water to a separate storage container yielding a final grind solids of 17%.

| Cab-O-Lite Dispersion Formulation | Dry Wt. % |
|---|---|
| Essex Gum 1390 (20% solution) | 39.22 |
| Vinol 325 (10% solution) | 34.14 |
| Surfynol 104 H | 0.50 |
| Cab-O-Lite | 26.14 |
| TOTAL | 100.00 |

These materials are dispersed in a Kady mill at 15% weight solids. The resulting dispersion is discharged to the storage container used to hold the bisphenol grind.

Thermal Black Final Blend Formulation

The final blend, having the following formulation, is prepared in the storage container having the combined bisphenol grind and Cab-O-Lite dispersions.

| | Dry Wt. % |
|---|---|
| Bisphenol grind | 47.03 |
| Cab-O-Lite | 38.26 |
| Arctic Paper White | 0.50 |
| Glyoxal 40 | 5.00 |
| Black image dye grind | 6.48 |
| Methocel A15 | 2.70 |
| Surfynol 104 H | 0.03 |
| TOTAL | 100.00 |

The resulting black image thermal response coating color at 15.8% weight solids exhibits excellent pot life. Observation and evaluation of samples retained after one month of idle storage revealed (1) absolutely no settling of solid particles, (2) a marked double layer liquid phase separation, comprised of about 25% by volume of a clear liquid supernatant, that was easily restored to a homogeneous coating with mild agitation, (3) no degradation in coating rheology after restoration, (4) no deterioration of functionality and (5) less than 5% loss in background whiteness from the time of blending.

The final formulation is coated on a paper substrate in an amount of 5 g/$m^2$ of coating weight, utilizing a conventional three roll reverse applicator system with roll speeds and nip gaps optimized to control foam. The coated paper is then dried and calendered.

The resulting thermally sensitive record material has a very low abrasion characteristic and an excellent background and provides good image density upon thermal imaging. Thus, it is quite suitable for use as a thermal printer or thermal chart record material.

EXAMPLE 3

A thermal record material is prepared in the same manner as described in Example 2 with the exception that the Acrawax C is replaced with stearamide (Armid HT).

The resulting thermal sheet has a very low abrasive characteristic and provides an excellent image to background contrast upon thermal imaging.

EXAMPLE 4

A thermal record material is prepared in the same manner as described in Example 2 with the exception that the Acrawax C is replaced with behenyl alcohol (Adol 60).

The resulting thermal sheet has a very low abrasive characteristic and provides an excellent image to background contrast upon thermal imaging.

EXAMPLE 5

A thermal record material is prepared in the same manner as described in Example 2 with the exception that the Acrawax C is replaced with stearone (a fatty ketone).

The resulting thermal sheet has a very low abrasive characteristic and provides an excellent image to background contrast upon thermal imaging.

EXAMPLE 6

A thermal record material is prepared in the same manner as described in Example 2 with the exception that lithium stearate is employed as the lubricant in place of zinc stearate.

The resulting thermal sheet has a very low abrasive characteristic and provides an excellent image to background contrast upon thermal imaging.

EXAMPLE 7

A thermal record material is prepared in thesame manner as described in Example 2 with the exception that Natrosol 250LR (hydroxyethyl cellulose) is used instead of Methocel A15.

The resulting thermal sheet has a very low abrasive characteristic and provides an excellent image to background contrast upon thermal imaging.

The invention being thus described, it will be obvious that the same may be varied in many ways. Such variations are not to be regarded as a departure from the spirit and scope of the invention, and all such modifications are intended to be included within the scope of the following claims.

We claim:

1. A thermally responsive record material comprising a substrate coated with a substantially colorless chromogeneous compound, a phenolic compound which is capable of liquefying and/or vaporizing at normal thermographic temperatures and thereby to react with said substantially colorless chromogeneous compound to form a colored mark, a substantially water-insoluble, cross-linked urea-formaldehyde agglomerated resin pigment in highly dispersed particulate form, and a suitable binder therefor.

2. A thermally responsive record material in accordance with claim 1, wherein said urea-formaldehyde resin pigment has a mean agglomerate size of from about 2 to about 10 microns.

3. A thermally responsive record material in accordance with claim 1, wherein the BET specific surface area of said urea-formaldehyde resin pigment is about 40 to about 75 square meters per gram.

4. A thermally responsive record material in accordance with claim 1, wherein the molar ratio of urea to formaldehyde in said urea-formaldehyde resin pigment is from about 1:1.3 to about 1:1.8.

5. A thermally responsive record material in accordance with claim 1, wherein at least a portion of the binder is water-soluble.

6. A thermally responsive record material in accordance with claim 5, wherein the binder is selected from the group consisting of polyvinyl alcohol, starch, hydroxyethylcellulose, methylcellulose, hydroxypropyl methylcellulose and mixtures thereof.

7. A thermally responsive record material in accordance with claim 6, wherein the binder is polyvinyl alcohol.

8. A thermally responsive record material in accordance with claim 6, wherein the binder is starch.

9. A thermally responsive record material in accordance with claim 6, wherein the binder is hydroxyethylcellulose.

10. A thermally responsive record material in accordance with claim 6, wherein the binder is methylcellulose.

11. A thermally responsive record material in accordance with claim 6, wherein the binder is hydroxypropyl methylcellulose.

12. A thermally responsive record material in accordance with claim 1, which further comprises a lubricant or release agent.

13. A thermally responsive record material in accordance with claim 12, wherein the lubricant is zinc stearate.

14. A thermally responsive record material in accordance with claim 12, wherein the lubricant is lithium stearate.

15. A thermally responsive record material in accordance with claim 12, wherein the release agent is a fatty diamide wax.

16. A thermally responsive record material in accordance with claim 15, wherein said fatty diamide wax is a reaction product of hydrogenated castor oil and ethanolamine.

17. A thermally responsive record material in accordance with claim 12, wherein the release agent is stearamide.

18. A thermally responsive record material in accordance with claim 12, wherein the release agent is behenyl alcohol.

19. A thermally responsive record material in accordance with claim 12, wherein the release agent is stearone.

20. A thermally responsive record material in accordance with claim 1, wherein the substrate is paper.

21. A thermally responsive record material in accordance with claim 1, wherein the substantially chromogeneous compound is a phthalide or fluoran compound.

22. A thermally responsive record material in accordance with claim 21, wherein said substantially colorless chromogeneous compound is Crystal Violet Lactone.

23. A thermally responsive record material in accordance with claim 21, wherein said substantially colorless chromogeneous compound is 2′-anilino-3′-methyl-6′-diethylamino fluoran.

24. A thermally responsive record material in accordance with claim 1, wherein said phenolic compound is bisphenol A.

25. A process for the preparation of thermally responsive record material which comprises (A) preparing separate aqueous dispersions comprising (1) substantially colorless chromogenic material and a binder, (2) a phenolic compound which is capable of liquefying and /or vaporizing at normal thermographic temperatures and thereby to react with said substantially colorless chromogeneous compound to form a colored mark, a binder and a lubricant or wax, and (3) a substantially water-insoluble, cross-linked urea-formaldehyde agglomerated resin pigment in highly dispersed particulate form, (B) blending said dispersions to provide a coating formulation, and (C) coating said formulation on a substrate sheet.

26. A process in accordance with claim 25, wherein the dispersions comprising the substantially colorless chromogenic material includes a wetting agent and defoamer.

27. A process in accordance with claim 25, wherein the dispersion comprising the phenolic compound includes a wetting agent and defoamer.

28. A process in accordance with claim 25, wherein the dispersion comprising the substantially colorless chromogenic material contains about 15 to 40 percent solids in water.

29. A process in accordance with claim 25, wherein the dispersion comprising the phenolic compound contains about 15 to 40 percent solids in water.

30. A process in accordance with claim 25, wherein the dispersion containing the urea-formaldehyde resin pigment contains about 5 to 50% dry weight of said pigment.

31. A process in accordance with claim 25, wherein the coating formulation comprises about 1 to 10% by weight of said substantially colorless chromogenic material, about 5 to 50% by weight of said phenolic compound, about 10 to 60% by weight of a binder and greater than 0% to about 50% by weight of said urea-formaldehyde resin pigment.

32. A process in accordance with claim 31, wherein the coating formulation further includes about 1 to 10% by weight of a lubricant and about 1 to 25% by weight of a wax.

33. A process in accordance with claim 32, wherein the coating formulation further includes less than about 1% by weight of a wetting agent and defoamer.

34. A process in accordance with claim 32, wherein the coating formulation contains up to about 30% by weight of said urea-formaldehyde resin pigment.

* * * * *